United States Patent
Ippach et al.

(10) Patent No.: US 8,427,965 B2
(45) Date of Patent: Apr. 23, 2013

(54) METHOD TO OPTIMIZE THE DATA STREAM BETWEEN A ROUTER AND A MULTIMEDIA UNIT

(75) Inventors: Holger Ippach, Lausanne (CH);
Corinne Le Buhan, Les Paccots (CH);
Marc Uldry, Attalens (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1311 days.

(21) Appl. No.: 11/705,156

(22) Filed: Feb. 12, 2007

(65) Prior Publication Data
US 2007/0201477 A1      Aug. 30, 2007

(30) Foreign Application Priority Data
Feb. 24, 2006   (EP) ...................................... 06110413

(51) Int. Cl.
   *H04L 12/66*     (2006.01)
   *H04L 12/56*     (2006.01)
   *H04N 7/173*     (2011.01)
   *H04N 7/16*      (2011.01)

(52) U.S. Cl.
   USPC ........... 370/252; 370/389; 725/119; 725/127; 725/149

(58) Field of Classification Search .................. None
See application file for complete search history.

(56) References Cited

U.S. PATENT DOCUMENTS

| | | | | |
|---|---|---|---|---|
| 5,848,233 A * | 12/1998 | Radia et al. | ...................... | 726/13 |
| 5,852,290 A * | 12/1998 | Chaney | .......................... | 235/492 |
| 6,442,589 B1 * | 8/2002 | Takahashi et al. | ............ | 709/203 |
| 6,637,029 B1 * | 10/2003 | Maissel et al. | .................. | 725/46 |
| 6,813,270 B1 * | 11/2004 | Oz et al. | ......................... | 370/394 |
| 7,046,805 B2 * | 5/2006 | Fitzhardinge et al. | ........ | 380/212 |
| 7,089,579 B1 * | 8/2006 | Mao et al. | ...................... | 725/109 |
| 2002/0026501 A1 * | 2/2002 | Hoang | .......................... | 709/219 |
| 2002/0044222 A1 * | 4/2002 | Lee | ................. | 348/564 |
| 2003/0035424 A1 * | 2/2003 | Abdollahi et al. | ............. | 370/392 |
| 2003/0035425 A1 * | 2/2003 | Abdollahi et al. | ............. | 370/392 |

(Continued)

FOREIGN PATENT DOCUMENTS

EP       1119120 A       7/2001

OTHER PUBLICATIONS

European Search Report.

*Primary Examiner* — Steven H Nguyen
(74) *Attorney, Agent, or Firm* — Harness, Dickey & Pierce, P.L.C.

(57) ABSTRACT

Even if high speed are available between the router and the multimedia unit through the IP line (up to 24 Mbits/sec), this is still the bottleneck in term of data transfer. Indeed in practice the vast majority of IP users have access speed between 2 to 5 Mbits/sec and the development of other services (telephony, videoconference, push VOD, game) are bandwidth consuming. It is now an object of the invention to propose a solution to reduce the data flow between the router and the multimedia unit over IP line.

This is achieved by a method to optimize the data stream between a router and a multimedia unit, the router receiving at least one data stream forming a service and comprising several sub-streams from which part of them are alternatively used by the multimedia unit, the method comprising the steps of:

defining a set of data representing the multimedia unit's profile,
transmitting this set of data to the router,
filtering by the router the unnecessary sub-stream according the given profile,
sending the remaining sub-streams to the multimedia unit.

9 Claims, 1 Drawing Sheet

U.S. PATENT DOCUMENTS

| | | | |
|---|---|---|---|
| 2003/0048854 A1* | 3/2003 | Kaku | 375/240.29 |
| 2003/0097663 A1* | 5/2003 | Puputti | 725/132 |
| 2003/0163528 A1 | 8/2003 | Banerjee et al. | |
| 2004/0237099 A1* | 11/2004 | Shin et al. | 725/31 |
| 2005/0076367 A1* | 4/2005 | Johnson et al. | 725/58 |
| 2005/0101246 A1* | 5/2005 | Choi et al. | 455/3.01 |
| 2005/0166244 A1* | 7/2005 | Moon | 725/95 |
| 2006/0143655 A1* | 6/2006 | Ellis et al. | 725/47 |
| 2007/0136777 A1* | 6/2007 | Hasek et al. | 725/114 |

* cited by examiner

METHOD TO OPTIMIZE THE DATA STREAM BETWEEN A ROUTER AND A MULTIMEDIA UNIT

PRIORITY STATEMENT

This application claims benefit of priority under 35 U.S.C. §119 from European Patent Application No. 06110413.9 filed on Feb. 24, 2006, in the European Patent Office, the disclosure of which is incorporated herein by reference in its entirety.

INTRODUCTION

The present invention concerns the field of broadcasting multimedia services over the Internet access. It concerns in particular the field of broadcasting television channels from a termination located close to the PABX Telephone System through the telephone line until the multimedia device.

BACKGROUND ART

Today, the solutions to deliver television programs through the DSL line are based on the injection of video signals at the PABX level, i.e. the telephone exchange receiving the so called "last mile" line to the end user. The router, also called IGMP termination point, has the task to receive all broadcasted services and inject one of them to the line of a single user, according to the end user selection. A service can be a television channel, game channel, information data channel such as stock exchange data, available for a plurality of users or dedicated to only one user (Video On Demand).

The router is connected through a very high speed communication link with the broadcasting center which is in charge with preparing all services. There are different types of services, some being accessible to all users, and other being dedicated to a limited number of users (subscription, pay-per-view). The router has the task to filter among the various services, the service requested by a user, and to extract this service to inject it on the user's line.

The multimedia unit of the user is able to send a selection command to the router in order to set up the filter of said router to the requested service.

In the IP world, the router (also known as IGMP termination point) is in charge of receiving a bundle of elementary streams together constituting a channel (or service) according to the MPEG-2 systems standard. Each elementary stream is identified by a specific Packet Identifier (PID) carried into the MPEG-2 packets headers. Examples of such a stream include:

- video streams (usually one single video stream is transmitted because this is the most costly stream in terms of bandwidth, but in advanced applications multiple views, e.g. from different cameras on a sports event, or multiple resolutions, e.g. matching heterogeneous end user devices capabilities, may be associated with different elementary streams for the user to select)
- audio streams (audio1, audio2, audio3 . . . ) corresponding for instance to different languages for the user to select or different coding method (stereo, 5:1),
- conditional access streams (ecm1, ecm2) corresponding to different conditional access systems operating jointly in a "simulcrypting" broadcast environment according to the DVB standards,
- Electronic Program Guide (EPG) data which contains the description in user-friendly form of the services available from the router. Usually, each provider shape its own EPG for marketing purpose (advertisement) and to allow the user to select the channels among the channels available through this provider.

The available speed between the router and the multimedia unit enables to unicast the necessary streams to form one channel over the IP line.

SHORT DESCRIPTION OF THE INVENTION

Even if high speed are available between the router and the multimedia unit through the IP line (up to 24 Mbits/sec), this is still the bottleneck in term of data transfer. Indeed in practice the vast majority of IP users have access speed between 2 to 5 Mbits/sec and the development of other services (telephony, videoconference, push VOD, game) are bandwidth consuming: It is now an object of the invention to propose a solution to reduce the data flow between the router and the multimedia unit over IP line.

This is achieved by a method to optimize the data stream between a router and a multimedia unit, the router receiving at least one data stream forming a service and comprising several sub-streams from which part of them are alternatively used by the multimedia unit, the method comprising the steps of:

defining a set of data representing the multimedia unit's profile,
transmitting this set of data to the router,
filtering by the router the unnecessary sub-stream according the given profile,
sending the remaining sub-streams to the multimedia unit.

As already indicated, the router receives the indication which will be used to filter the sub-streams not used by the multimedia unit. This is for example a language not understood by the end user or a control access stream not supported by the multimedia unit security device.

One can define two filter's categories. The user hardware environment defines the first category in which one can find the access control data, the electronic program guide. This is the so called "static profile". These sub-streams are dependent of the subscription type and access control provider. The user cannot change these settings without signing a new contract or at least taking contact with the service provider. In this category one can also find the selection not allowed by the user. In case that two or more video streams are available at the router and the user has subscribed to only the main stream, the selection of the additional video streams is not allowed by the user and thus filtered by the router.

The second category is the sub-streams that can be dynamically changed by the user, also called the dynamic profile. This includes typically the language selection. In this case, the current language is selected among the available languages. The current language is not a fixed parameter defined while initializing the multimedia unit, as it can rather change depending on the person currently watching the television channel.

In the same manner, the video streams selection, in particular for sport event (from team A or from team B prospective, viewing angle, slow down), is managed by the dynamic profile since the selection of the video stream can be made at any time by the user.

According to an embodiment, the broadcasting center BC feeds the router with two or more video streams, each having a different resolution. According to the invention, only one will be transmitted at a time based on the current user's profile.

BRIEF DESCRIPTION OF THE DRAWINGS

The invention will be better Understood thanks to the attached drawings in which:

the FIG. 1 shows the a router receiving the whole set of streams and injecting a subset of those streams toward a multimedia unit, the FIG. 2 shows the connection of the router to the backbone in which the management center and the broadcasting center are connected.

DETAILED DESCRIPTION

A DSLAM is a network device, usually at a telephone company central office, that receives signals from multiple customer Digital Subscriber Line (DSL) connections and puts the signals on a high-speed backbone line using multiplexing techniques. This subscriber's line is used to transmit and receive the IP packets as well as standard telephone line. When the phone company receives a DSL signal, an ADSL modem with a POTS (plain old telephone service) splitter detects voice calls and data. Voice calls are sent to the PSTN (Public Switched Telephone Network), and data are sent to the DSLAM, where it passes through the ATM to the Internet, then back through the DSLAM and ADSL modem before returning to the customer's multimedia unit MC.

Depending on the product, routers or DSLAM multiplexers, connect DSL lines with some combination of asynchronous transfer mode (ATM), frame relay, or Internet Protocol networks. DSLAM enables a phone company to offer business or homes users the fastest phone line technology (DSL) with the fastest backbone network technology (ATM).

The high speed data MStrm receiving from the backbone contains several multimedia channels, each having a plurality of sub-streams identified by a PID (Packet Identifier). The service information DVB-SI contains the Program Map Table PMT which contains the elementary streams within a service, i.e. the various packet identifier PID forming a single service. A service contains usually a video stream VPID, and audio stream APID and data such as EPG data.

Known router RT are able to receive from the multimedia unit MC a request for receiving a specified service. The router RT extracts from the Program Map Table PMT the packets concerned by a given service and inject on the DSL line the various packets forming this service.

Figure 1:
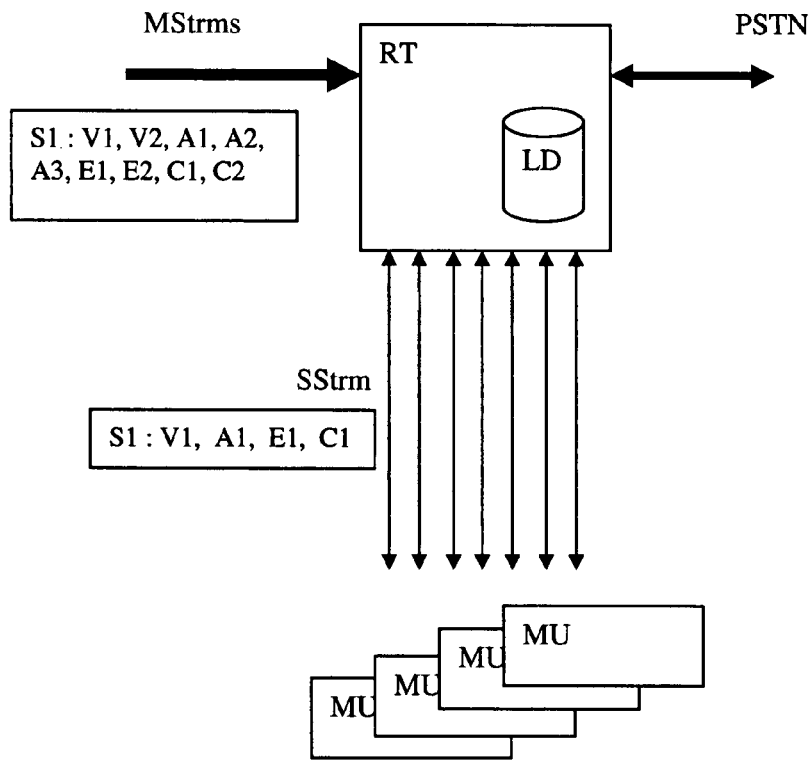
Figure 2:
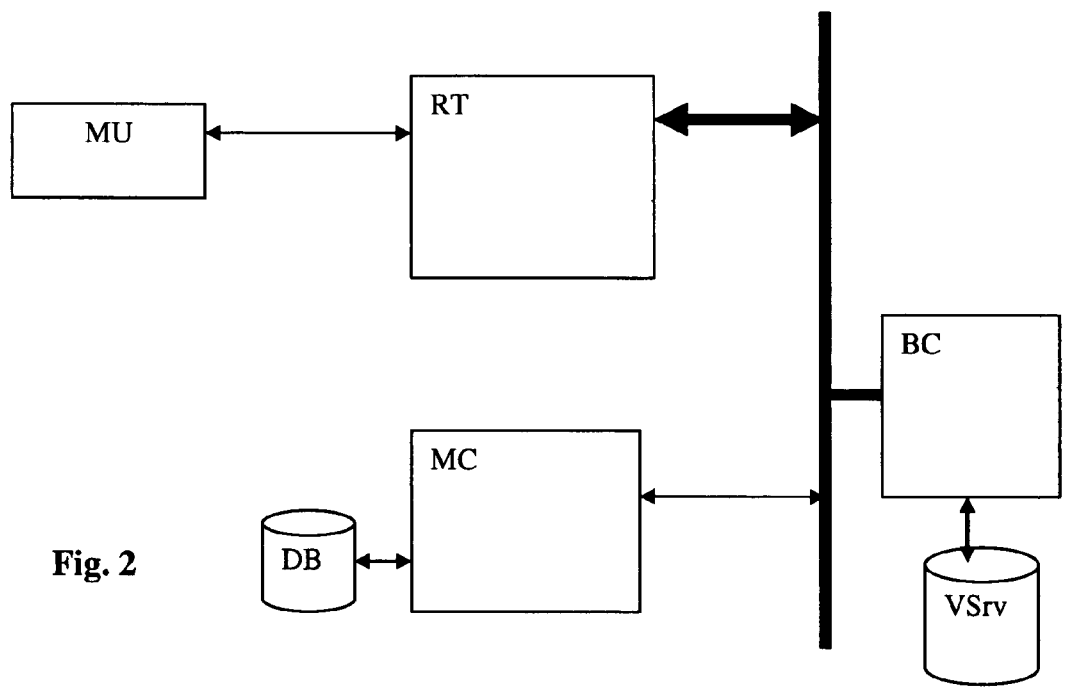

The FIG. 1 shows the example where the main stream MStrm contains a plurality of services, a given service S1 containing two video streams V1, V2, three audio streams A1, A2, A3, two EPG data E1, E2 and two control streams C1, C2 embedding the control messages for decrypting the video and audio streams.

According to the invention, the router RT comprises the user's profile in a local database LD allowing it to filter the unwanted sub-streams as shown in the FIG. 1. The resulting stream S1 comprises only one video stream V1, one audio stream A1 as well as one EPG data E1 and control C1 stream. The filtering process is carried out in the router thanks to the user's profile.

When the user requests another service, the same filtering action is performed on another service, thus reducing the bandwidth necessary between the router RT and the multimedia unit MU.

There are different ways to load the user's profile within the local database LD of the router RT. The first method rely on the multimedia unit only. Additional information data are provided to the multimedia unit MC concerning the composition of each service as described in the Program Map Table PMT. This table describes for each service, the various elementary streams composing said service. Beside the identification of the PID of each elementary stream, a descriptor is added to identify the stream. For languages, a standard list is known as ISO 639. This list comprises a two (or three) letters code to identify the language. The multimedia unit should interpret these information to be able to identify the relevant PID composing a service and isolate the proper PID among the various packets. For selecting the language, the multimedia unit should extract for the Program Map Table PMT the audio PID relative to the English language, i.e. by searching the identification "en" in the PMT table. Once this information obtained, as well as for various possible selections, the multimedia unit is able to inform the router RT on the desired elementary streams. The task of the router is simple since it has just to apply these information on the filtering unit. The information provided by the multimedia unit to the router can be positive or negative. By positive, it is meant that the multimedia unit sends the elementary streams identifier not to be filtered. The other elementary streams are thus excluded by the router's filter. By negative, it is meant the elementary streams identifier to be excluded by the router's filter.

The multimedia unit MU is preferably loaded with default value for sub-streams not available. This is the case for the EPG data provided by another provider than the one with which user is bound. The selection is simply not proposed to the user.

According to another embodiment, the understanding of the various sub-streams forming a service is done by the router. The multimedia unit MC only sends a profile information data containing the user's preferences (e.g. language) as well as technical information (provider, access control system). The router compiles this information and determines the sub-streams concerned for the filtering unit thanks to the information provided in the Program Map Table PMT.

According to another embodiment, the management center MC contains the user's profile and send them to the router RT. The profile information can have different formats.

The first format is an high level definition such as language preference and setting up of the multimedia unit. As explained previously, this data allows the router to determine which elementary stream is to be filtered thanks to the processing of the PMT (Program map Table). Each time the user selects another service, the router RT processes the PMT and filters out the unwanted streams accordingly. The profile comprises for example "en" for English and this parameter is used to scan the PMT in order to set the filter only to the audio elementary stream referenced to "en" in the PMT.

The second format is a low level definition. The management center MC prepares a definition file containing the list of elementary streams to be broadcasted for a given user. This list is made for each service available to the user. The filtering criteria are based on the user's profile comprising the static profile and the dynamic profile.

When the user wishes to change a parameter of its profile, a corresponding request is sent to the management center MC preferably along with the identification of the multimedia unit. This change could be global, i.e. affecting all services and therefore not needing to be accompanied with the service concerned or specific to a service, thus the service ID should be added in the request.

In return, the management center MC sends a command to the router according to this selection in one of the format specified above.

According to an embodiment of the invention, an initialization step is performed by the management center (MC) based on the static profile of a given multimedia unit. The Management center determines for each broadcasted service, the sub-streams identifier (PID) which match the multimedia unit static profile. At a second stage, the multimedia unit can directly update its profile (the dynamic profile) with the router (RT) or to the management center.

The invention claimed is:

1. A method for optimizing at least one sub-data stream between a router and a multimedia unit, the router receiving a data stream including a plurality of sub-data streams forming a plurality of services, the at least one sub-data stream between the router and the multimedia unit being a sub-data stream of the plurality of sub-data streams, at least one service of the plurality of services being formed of at least a portion of the plurality of sub-data streams, a subset of said portion being transmitted to the multimedia unit, and said subset including the at least one sub-data stream, the method comprising:

defining a dataset representing a profile of the multimedia unit, the dataset including at least one of a spoken language and an access subscription of a user, transmitting the dataset to the router, configuring a filter in the router according to the transmitted dataset, receiving, by the router, a request from the multimedia unit for the at least one service, selecting said portion of the plurality of sub-data streams forming the at least one requested service, filtering, by the router, the subset from said portion of the plurality of sub-data streams based on the transmitted dataset, and, transmitting the filtered subset forming the requested at least one service to the multimedia unit.

2. The method of claim 1 in which the data stream includes information data describing the meaning of the sub-streams (PID) defining the service, the method further including, determining, by the multimedia unit, a sub-streams identifier of the service matching the profile of the multimedia unit based on the information data, and sending to the router, by the multimedia unit, information allowing the router to send the selected sub-streams related to the service.

3. The method of claim 2, wherein the information sent to the router contains a list of the sub-streams identifier to be filtered by the filter of the router.

4. The method of claim 2, wherein the information sent to the router contains a list of the sub-streams identifier to be allowed for sending by the filter of the router.

5. The method of claim 1 in which the at least one data stream includes information data describing the meaning of the sub-streams (PID) defining the service, the method further including, receiving, by the router, from the multimedia unit at least a part of a current profile of the multimedia unit, selecting, by the router, the sub-streams identifier of the service matching the profile of the multimedia unit based on the information data, and setting, by the router, the filter of the router according to the selected sub-streams.

6. The method of claim 1 in which the data stream is managed by a management center, the method further including, sending from the multimedia unit at least a part of a current profile of the multimedia unit to the management center, selecting by the management center a sub-streams identifier (PID) of the service matching the profile of the multimedia unit, sending the selected sub-streams identifier to the router, and setting the filter of the router according to the selected sub-streams.

7. The method of claim 1 in which the data stream is managed by a management center, the method further including, selecting by the management center a sub-streams identifier of the plurality of services matching the profile of the multimedia unit, sending selected sub-stream identifiers to the router, storing in a database of the router, for a given multimedia unit, the sub-stream identifiers in relation with a service, receiving from the multimedia unit a request to access a given service, loading from the database of the router, a set of sub-streams identifier related to the service, and setting the filter of the router according to the selected sub-streams.

8. The method of claim 7, the method further including, sending by the multimedia unit at least a part of a profile of a current multimedia unit to the management center related to a given service, selecting by the management center the sub-streams identifier of the service matching the profile of the multimedia unit, sending the selected sub-stream identifiers of the service to the router, and setting the filter of the router for the service according to the selected sub-streams.

9. The method of claim 7, in which the data stream includes information data describing the meaning of the sub-streams defining the service, the method further including, sending by the multimedia unit at least a part of a profile of a current multimedia unit to the router related to a given service, determining the sub-streams identifier of the service matching the profile of the multimedia unit profile based on the information data, and setting the filter of the router for the service according to the selected sub-streams.

* * * * *

UNITED STATES PATENT AND TRADEMARK OFFICE
CERTIFICATE OF CORRECTION

| | | |
|---|---|---|
| PATENT NO. | : 8,427,965 B2 | Page 1 of 1 |
| APPLICATION NO. | : 11/705156 | |
| DATED | : April 23, 2013 | |
| INVENTOR(S) | : Ippach et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1421 days.

Signed and Sealed this
Sixteenth Day of December, 2014

Michelle K. Lee
*Deputy Director of the United States Patent and Trademark Office*